No. 621,003.  
W. G. WEBB & J. V. PRICE.  
ACETYLENE GAS GENERATOR.  
(Application filed Aug. 8, 1898.)  
Patented Mar. 14, 1899.
(No Model.)  
2 Sheets—Sheet 1.
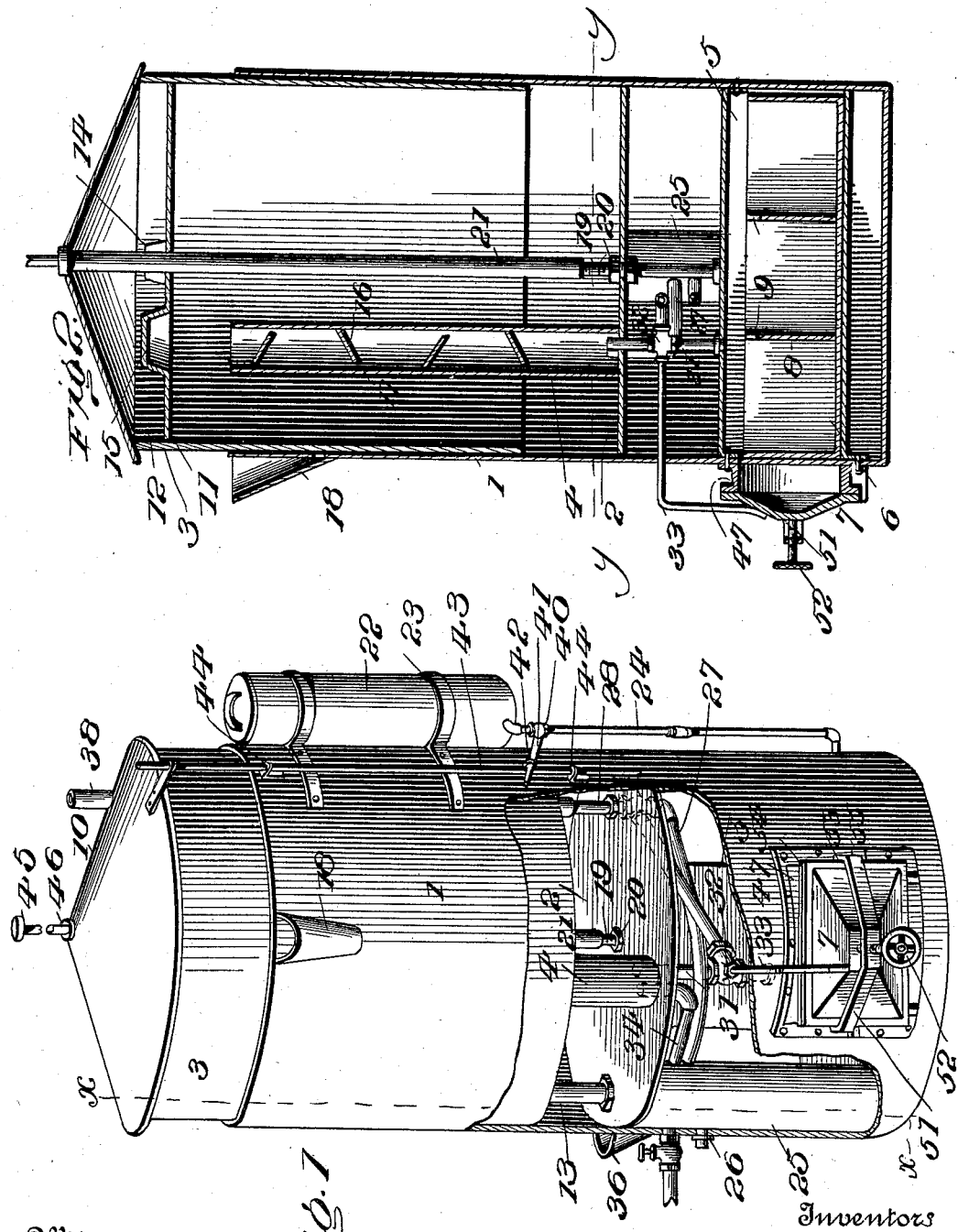
Witnesses  
Inventors  
William G. Webb  
Jesse V. Price  
F. W. Bond  
by  
Attorney No. 621,003. Patented Mar. 14, 1899.
W. G. WEBB & J. V. PRICE.
ACETYLENE GAS GENERATOR.
(Application filed Aug. 8, 1898.)
(No Model.) 2 Sheets—Sheet 2.
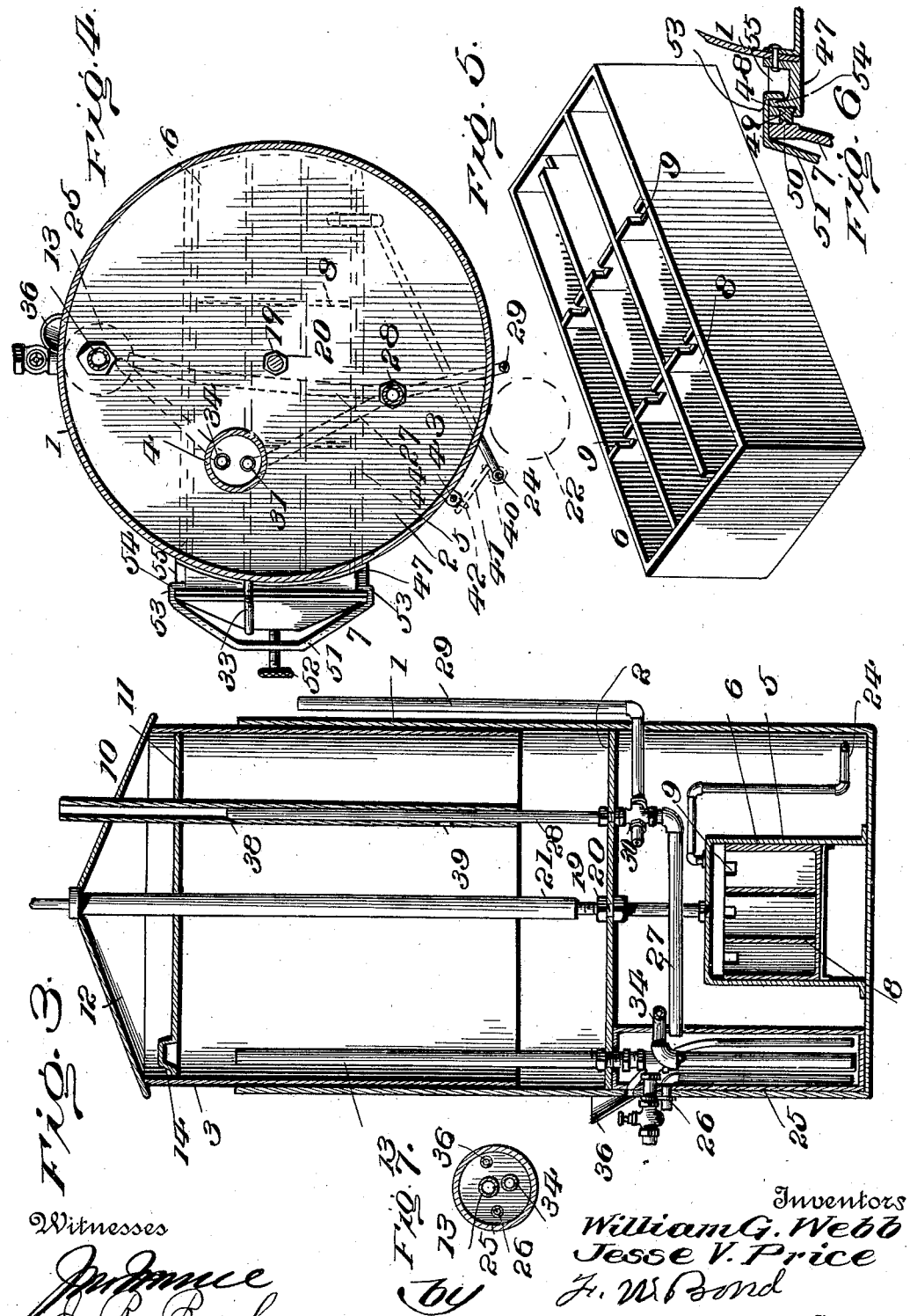

UNITED STATES PATENT OFFICE.

WILLIAM G. WEBB AND JESSE V. PRICE, OF GNADENHUTTEN, OHIO.

ACETYLENE-GAS GENERATOR.

SPECIFICATION forming part of Letters Patent No. 621,003, dated March 14, 1899.

Application filed August 8, 1898. Serial No. 688,059. (No model.)

*To all whom it may concern:*

Be it known that we, WILLIAM G. WEBB and JESSE V. PRICE, citizens of the United States, residing at Gnadenhutten, in the county of Tuscarawas and State of Ohio, have invented certain new and useful Improvements in Acetylene-Gas Generators; and we do hereby declare that the following is a full, clear, and exact description of the same, reference being had to the annexed drawings, making a part of this specification, and to the figures of reference marked thereon, in which—

Figure 1 is a perspective view showing parts broken away. Fig. 2 is a vertical section. Fig. 3 is a vertical section through line $xx$, Fig. 1. Fig. 4 is a transverse section through line $yy$, Fig. 2. Fig. 5 is a detached view of the carbid-box. Fig. 6 is a view showing a portion of the door and illustrating casing and clamp.

The present invention has relation to acetylene-gas generators; and it consists in the different parts and combination of parts hereinafter described, and particularly pointed out in the claims.

Similar numbers of reference indicate corresponding parts in all the figures of the drawings.

In the accompanying drawings, 1 represents the casing, which is formed of a size to correspond with the size of the generator designed and calculated to be constructed. The upper portion of the casing 1 constitutes the tank, and, as shown, it is provided with the bottom 2, which bottom is located and arranged substantially as shown in the drawings. The bottom or lower end of the casing 1 constitutes the base of the casing and may be open.

Within the casing 1 and above the bottom 2 is located the gasometer 3, which gasometer is formed of a less diameter than the diameter of the casing, so that said gasometer is free to move up and down, as hereinafter described. Upon the bottom 2 is located the gas conveying and condensing tube 4, which extends upward to a level with the top of the casing 1. Below the bottom 2 and within the casing 1 is located the generator 5, which generator consists of a metal receptacle, which receptacle is held in place in any convenient and well-known manner.

The receptacle-generator 5 is opened in front, so that the carbid-box 6 may be placed in position when the door 7 is opened.

The carbid-box 6 is provided with different compartments, which compartments are produced by the partitions 8, it being understood that any desired number of compartments may be employed without departing from the nature of our invention. In use the carbids are placed in the different compartments of the carbid-box proper, and when it is desired to generate gas water is conveyed to one of the carbid-box compartments, and when the carbid has been consumed water will pass into the next compartment through a passage, such as 9, at which time gas will be generated, and this process is continued until all of the carbids in the different compartments have been consumed.

The gasometer 3 may be provided with the conical top 10, and a short distance below said conical top is located the false top 11, by which arrangement the chamber 12 is provided, which is for the purpose hereinafter described. As the gas becomes generated it extends upward through the pipe 4 into the gasometer, from whence it is conveyed through the pipe 13 in the ordinary manner.

For the purpose of providing a means for allowing the false top 11 to rest on the top of the water contained in the tank and at the same time providing a means for allowing said false top to come below the upper ends of the pipes 4 and 13 the cup-chambers 14 and 15 are provided and into which cup-chambers said pipes extend. Then the false top rests upon the water.

The object and purpose of providing a means for allowing the false top to come in direct contact with the water are to expel all of the air contained in the gasometer, and thereby prevent any great amount of air from being commingled with the gas.

For the purpose of purifying the gas and taking out the condensation the pipe 4 is provided with any desired number of deflectors, such as 16, by which arrangement the gas comes in contact with the bottom or under sides of the deflectors, and a greater portion of said gas is turned backward and finds its way upward through the spaces 17, which spaces are located and arranged substantially as shown in the drawings. For the purpose of filling the tank the funnel 18 is provided and is located substantially as shown in Fig. 1, its bottom or lower end communicating with the tank.

For the purpose of holding and assisting the gasometer the guide-rod 19 is provided, which guide-rod is securely attached at its bottom or lower end to the top of the generator and extends upward through the bottom 2, to which bottom it is securely connected by means of the lock-nuts 20. Upon the guide-rod 19 is located the tube 21, which tube is connected to the top or upper end of the gasometer in any convenient and well-known manner.

To one side of the casing 1 is located the auxiliary tank 22, which is held in proper position by means of the bands 23 or their equivalents. From the auxiliary tank 22 leads the pipe 24, which pipe extends to and communicates with the generator 5, said pipe being for the purpose of conveying water to the different compartments of the carbid-boxes located in the generator.

Within the casing 1 and below the bottom 2 is located the tank 25, which tank is closed at its top and bottom ends. Within the tank 21 is located the overflow-pipe 26, which overflow-pipe leads through the casing 1, as illustrated in the drawings.

For the purpose of conveying sediment to the tank 25 the pipe 27 is provided, which pipe leads into the tank 25 and extends upward and communicates with the safety-pipes 28 and 29, which pipes are connected together by means of the cross 30, to which cross the pipes are connected.

For the purpose of conveying the gas from the generator to the tube 4 the pipe 31 is provided, which pipe extends upward through the bottom 2 and into the bottom or lower end of the pipe 4. The pipe 31 is provided with the valve 32, which valve is provided with the operating-handle 33, which operating-handle is so arranged with reference to the valve that when the valve is in position to convey the gas through the tube 31 and into the pipe 4 the lever or operating-handle 33 will be directly over the door 7, as illustrated in the drawings, so that said door cannot be opened until the operating-handle 33 is given a quarter-turn, thereby allowing the door to be open and at the same time keeping the gas from escaping from the gasometer to the generator.

For the purpose of removing the condensation from the bottom of the tube 4 the pipe 34 is provided, which pipe is extended through the bottom 2 and into the tank 25, said pipe being extended to merely the bottom or lower end of said tank.

It will be understood that before starting to generate gas the tank 25 should be filled with water for the purpose of sealing the pipes contained in said tank, the tank being filled by means of the funnel 36, said parts being located substantially as shown in the drawings.

In case of an overproduction of gas and in order that the same may be conveyed to the open air, the tube 38 is connected to the gasometer and moves up and down with the gasometer. The tube 38 is provided with the aperture 39, and when said aperture reaches a point above the water-line the gas will enter said tube through said aperture, from whence it is conveyed to the open air through the pipe 29. If in the event the gasometer should become caught so that it would not move, the gas would be forced down the pipes 4 and 13 and into the tank 25, thereby forcing the water out of said tank and escaping to the open air through the pipe 26.

For the purpose of automatically operating the valve 40, located in the pipe 24, the lever 41 is provided, which lever extends through the swivel-eye 42, which swivel-eye is connected to the rod 43, which rod is connected to the top or upper end of the gasometer in any convenient and well-known manner.

For the purpose of keeping the rod 43 in proper position at all times the guides 44 are provided, which guides are connected to the casing 1, as illustrated in the drawings. For the purpose of limiting the upward movement of the gasometer the top or upper end of the guide-rod 19 is provided with the cap or head 45, which cap or head prevents the upward movement of the gasometer when said gasometer has reached the desired height by reason of the block or head 46 striking the bottom or under sides of the cap or head 45.

The various pipes that extend through the bottom 2 are provided with lock-nuts, such as 20, located above and below the bottom and are for the purpose of making a close joint and at the same time properly bracing the bottom against downward pressure. The door-casing 47 is provided with a dovetail groove 48, and into which dovetail groove is placed the rubber gasket 49, the door 7 being provided with the bead 50, which bead is pressed into the outer face of the rubber gasket 49 when the door 7 is properly closed and clamped. The clamp 51 is located substantially as shown in Fig. 1 when placed in proper position and is tightened by means of the screw and handle 52, said clamp being provided with the hooked ends 53, which hooked ends embrace the flange 54, as illustrated in Fig. 2. For the purpose of preventing the clamp from going below a certain point the lugs 55 are provided and are formed integral with or attached to the door-casing 47.

Having described our invention, what we claim as new, and desire to secure by Letters Patent, is—

1. The combination of the casing 1 having located therein a gasometer, a bottom or partition located above the bottom or lower end of the casing, a chamber formed in the top or upper end of the gasometer above the false top 11, the false top 11 provided with the cup-chambers 14 and 15, the tube 4 located within the casing 1 and provided with the deflectors 16, the tube 13 located within the gasometer and extended to form a delivery-pipe, the guide-rod 19 having located thereon the tube 21 and means for generating gas, substantially as and for the purpose specified.

2. The combination of a casing provided with a partition or bottom located above the bottom or lower end of the casing, a generator provided with carbid-boxes, means for conveying water to the carbid-boxes, the tank 25 located below the bottom or partition and provided with an escape-pipe leading into the open air, a drip-pipe leading into the tank 25 from the gasometer and a drip-pipe extending into the pipe 25 and leading from the tube 4, a gasometer located within the casing and the tubes 4 and 13 all arranged, substantially as and for the purpose specified.

In testimony that we claim the above we have hereunto subscribed our names in the presence of two witnesses.

WILLIAM G. WEBB.
JESSE V. PRICE.

Witnesses:
L. S. WINSEH,
OT. A. MCCONNELL.